(No Model.)

A. D. CHANNELL.
BALING PRESS.

No. 244,547. Patented July 19, 1881.

WITNESSES:
Chas. Nida.
C. Sedgwick.

INVENTOR:
A. D. Channell
BY Munn & Co.
ATTORNEYS.

UNITED STATES PATENT OFFICE.

ALPEUS D. CHANNELL, OF SABETHA, KANSAS.

BALING-PRESS.

SPECIFICATION forming part of Letters Patent No. 244,547, dated July 19, 1881.

Application filed May 27, 1881. (No model.)

*To all whom it may concern:*

Be it known that I, ALPEUS D. CHANNELL, of Sabetha, in the county of Nemaha and State of Kansas, have invented a new and useful Improvement in Baling-Presses, of which the following is a full, clear, and exact statement.

Figure 1:
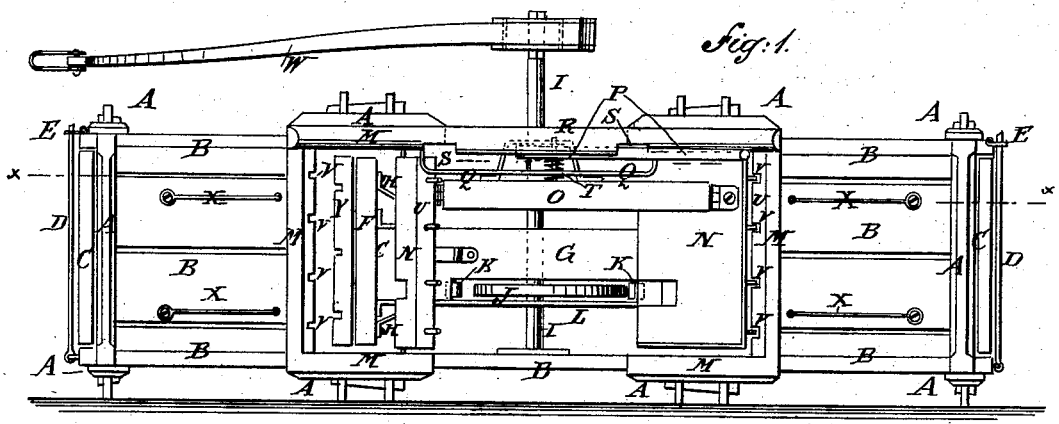
Figure 2:
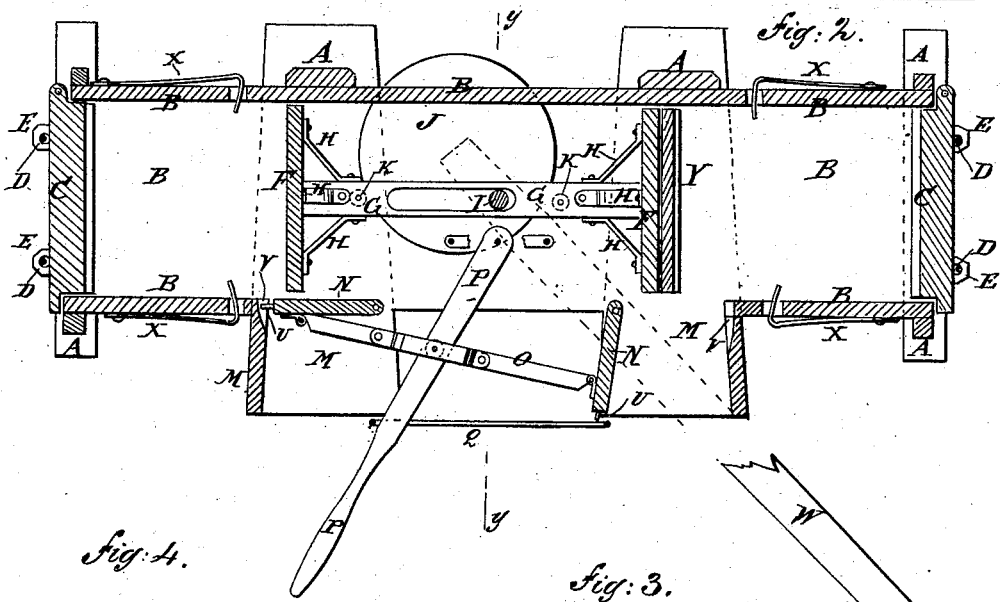
Figures 3, 4, 5:
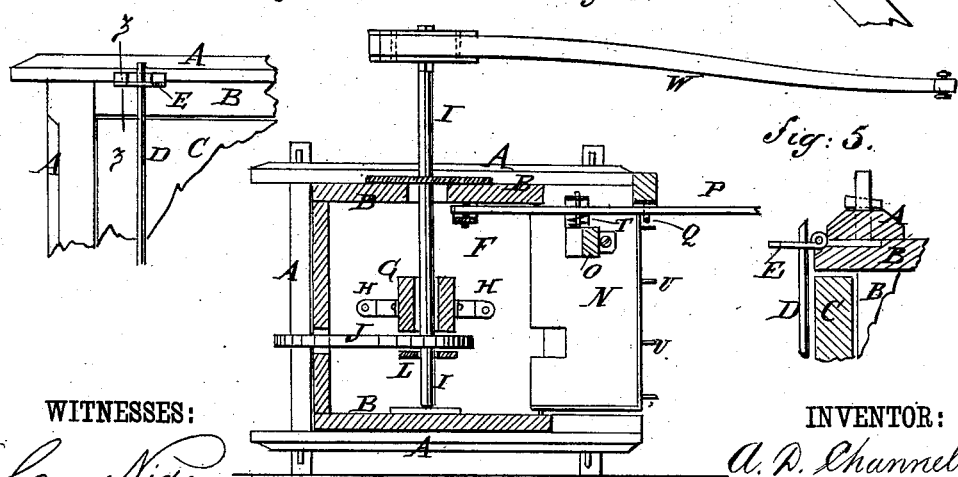

In the accompanying drawings, Figure 1 is a front elevation of my improvement. Fig. 2 is a sectional plan view of the same, taken through the line $x\,x$, Fig 1. Fig. 3 is a sectional end view of the same, taken through the line $y\,y$, Fig. 2. Fig. 4 is an elevation of a part of one end of the same. Fig. 5 is a sectional plan view of a part of the same, taken through the line $z\,z$, Fig. 4.

Similar letters of reference indicate corresponding parts.

The object of this invention is to facilitate the pressing of hay, cotton, wool, and other substances in bales.

The invention consists in the combination, with the two hoppers and the two baling-boxes, of the hinged doors, the hinged connecting-bar, and the hand-lever, whereby the hay in the hoppers can be forced into the baling-boxes to be carried forward by followers; and also in the combination, with the hoppers and the hinged doors, of the projecting rods or fingers, whereby the said doors are made to force all the hay in the hoppers into the baling-boxes, as will be hereinafter fully described.

A represents the frame of the press. The top, bottom, and sides of the end parts of the frame A, and the top, bottom, and rear side of the middle part of the same, are inclosed with a casing, B. The side casings, B, of the end parts of the press, which form the baling-boxes, are slotted for the passage of the bale-bands.

To the rear sides of the ends of the press are hinged the rear edges of the doors C, which are secured in place, when closed, by the rods or bars D. The lower ends of the bars D are hinged to the lower edges of the ends of the press, and the upper ends of the said bars, when closed, are secured in place by eye plates or hasps E, hinged to the upper edges of the said ends of the press, so that they can be readily placed upon and raised from the upper ends of the said locking-bars D. In the inner surface of the doors C are formed horizontal grooves to receive the bale-bands, the said grooves corresponding in number and position with the slots in the side casings, B.

The hay is compressed into the baling-boxes or end parts of the press by the followers F, which are rigidly secured to the opposite ends of a connecting-bar, G, and are strengthened in position by inclined braces H, attached to them and to the said bar G. The bar G is made of such a length that one of the followers will be withdrawn from one of the baling-boxes as the other follower is pushed into the other baling-box. The bar G is slotted longitudinally to receive the shaft I, which works in bearings in the top and bottom of the press A B.

To the shaft I is attached an eccentric-wheel, J, which is placed in a slot or notch in the bar G, so that the followers F will be moved in and out by the reciprocating rotary movement of the eccentric J. The face or the eccentric J rests against rollers K, pivoted to the bar G, or to the bar G and a bar or plate, L, attached to it.

To the side of the press A B, at the inner ends of the baling-boxes, are attached the hoppers M, through which the hay is inserted to be baled. Three sides of each of the hoppers M are stationary; but the inner or fourth side, N, is movable, and is hinged at its inner corners to the press A B, so that it can be turned up to serve as a side to the hopper, and turned down to push the hay inserted into the said hopper into the baling-box, and keep the said hay from being forced out by the action of the follower F. The hinged sides or doors N are connected by a bar, O, the ends of which are hinged to the outer parts of the said doors, so that one door N will be opened as the other is closed.

To the middle part of the connecting-bar O is pivoted a lever, P, the inner end of which is pivoted to the under side of the top of the press near the shaft I. The lever P passes through a long keeper, Q, attached to the under side of the middle part of a bar, R, and projects into such a position that it can be conveniently reached and operated by the pressman. The ends of the bar R are attached to the edges of the upper sides of the hoppers M. In the under side of the bar R, at the ends of the keeper Q, are formed notches S, to receive the lever P and hold it in position at either end of its stroke. The lever P is pressed up against the bar R, so as to enter the notches S, by a spiral or other spring, T, interposed between the said lever P and the bar O, as shown in Fig. 3.

To the outer edges of the doors N are attached rods U, projecting in the plane of the said doors N, and which, when the doors N are swung down, pass through grooves or slots V in the lower parts of the sides of the hoppers M, so as to force all the hay that may be in the said hoppers M into the baling-boxes.

To the upper end of the shaft I is attached the sweep W, which is curved downward to bring its outer end into proper position to receive the draft.

In using the machine the horses attached to the sweep W travel in one direction through the arc of a semi-circle, (more or less,) and are then turned and travel back through the same arc, the eccentric J forcing the followers F alternately into the baling-boxes. As the horses begin to turn the pressman shifts the lever P to open the door N next the horses and close the other door N, forcing the hay that may be in the hopper into the baling-box, ready to be pushed into the outer part of the said baling-box by the advancing follower F, and allowing the pressman to supply the other hopper M with hay ready to be forced into the baling-box in its turn. In this way the compressing is going on continuously. The hay compressed into the outer parts of the baling-boxes is kept from being forced back by expansion when the followers are withdrawn by spring-hooks X, which project through slots in the side casings, B, of the press, and incline toward the outer ends of the baling-boxes, as shown in Fig. 2. The outer parts or shanks of the spring-hooks X are attached to the outer sides of the side casings, B. With this construction as the hay is forced outward by the followers F it presses back and passes the spring-hooks X, but when the followers F have been withdrawn and the expansion of the hay tends to force it back through baling-boxes, the said hay is caught and held by the said hooks and cannot move back. When the desired quantity of hay for a bale has been forced into either of the baling-boxes the separate follower or head block Y is inserted through the hopper M, and is forced forward against the compressed hay by the action of the follower F. The separate head-blocks Y separate the compressed hay from that being forced into the baling-boxes, and have grooves in their outer sides or faces to receive the bale-bands, so that the doors C can be opened and the compressed bale can be tied while hay is being compressed against the rear side of the head-block Y. As hay continues to be compressed against the rear side of the head-block Y it forces the bound bale out of the baling-box, when the head-block Y can be removed and the door C closed and fastened to resist the pressure of the hay while the compression of the hay for the next bale is being completed.

If desired, the horses attached to the sweep W can travel around the press, giving a rotary instead of a reciprocating movement to the eccentric J, either movement being used, as circumstances may render most convenient.

The press is designed to be mounted upon wheels, so that it can be readily moved from place to place.

Having thus fully described my invention, what I claim as new, and desire to secure by Letters Patent, is—

1. In a baling-press, the combination, with the two hoppers M and the two baling-boxes A B, of the hinged doors N, the hinged connecting-bar O, and the hinged lever P, substantially as herein shown and described, whereby the hay in the hoppers can be forced into the baling-boxes to be carried forward by the followers, as set forth.

2. In a baling-press, the combination, with the hoppers M and the hinged doors N, of the rods U, substantially as herein shown and described, whereby the said doors are made to force all the hay in the hoppers into the baling-boxes, as set forth.

ALPEUS D. CHANNELL.

Witnesses:
J. E. CORWIN,
H. E. TURNER.